United States Patent Office 3,097,191
Patented July 9, 1963

3,097,191
POLYISOCYANATE COMPOSITIONS
Harold France and Arnold Lister, Manchester, England, assignors to Imperial Chemical Industries Limited, London, England, a corporation of Great Britain
No Drawing. Filed Mar. 27, 1958, Ser. No. 724,237
Claims priority, application Great Britain Mar. 29, 1957
4 Claims. (Cl. 260—77.5)

This invention relates to polyisocyanate compositions and more particularly to liquid polyisocyanate compositions based upon mixtures of aromatic amines and formaldehyde and especially useful for the manufacture of polyurethanes.

In the manufacture of polyurethanes from high molecular weight polyhydroxy compounds and polyisocyanates for use in lacquers, adhesives, plastic masses and the like a variety of polyisocyanates have been proposed but they have suffered from disadvantages such as toxicity, high melting point, low reactivity or discolouration of the reaction product.

We have now found that polyisocyanate compositions in respect of which these disadvantages are obviated or minimised can readily be prepared by phosgenating the mixed condensation products obtained from formaldehyde and mixtures of aromatic amines.

Thus according to the present invention we provide liquid polyisocyanate compositions obtained by phosgenating the polyamine compositions obtained by condensing formaldehyde with a mixture of at least two aromatic amines.

The processes used in the manufacture of the liquid polyisocyanate compositions are performed in the general manner described in the prior art or used commercially hitherto for the condensation of aromatic amines such as aniline with formaldehyde followed by phosgenation for example the phosgenation of 4:4'-diaminodiphenylmethane to 4:4'-diisocyanatodiphenylmethane; in order to obtain polyisocyanate compositions that are liquid at normal temperatures it is necessary only to use as starting materials suitable mixtures of at least two aromatic amines.

As examples of aromatic amines for use in the manufacture of the polyisocyanate compositions of this invention there may be mentioned aniline, o- and m-substituted anilines such as toluidines and alkyl anilines, chloroanilines, anisidines and nitroanilines, m-phenylene diamine and substituted m-phenylenediamines such as m-toluylene diamine and chlor-m-phenylene diamine.

The proportion of total amines to be reacted with formaldehyde is desirably large since by the use of substantially more than the theoretical requirement of two molecular proportions of amine to one molecular proportion of formaldehyde the undesirable production of polynuclear amines having more than two nuclei is minimised. A preferred amount of total amines is from 4 to 5 molecular proportions per molecular proportion of formaldehyde. Even larger amounts can be used but then economic and operating disadvantages begin to predominate.

The proportions of amines in the mixture thereof is chosen so as to give a polyisocyanate composition of the desired low melting point and this choice is most conveniently made by trial. In general it is found that very valuable liquid polyisocyanate compositions are obtained when the proportions of amines are chosen so that of the total amines converted into polyisocyanates not more than 80% by molecular proportions consists of any single amine. It is in general not possible to achieve this condition merely by ensuring that not more than 80% of the amine mixture to be reacted with formaldehyde consists of any single amine, since the reactivity of amines towards formaldehyde varies widely. Thus, for example, using a total amines to formaldehyde molecular ratio of 4.4 to 1, a mixture of 9 molecular proportions of aniline and 1 molecular proportion of o-toluidine produces ultimately a distilled mixed diisocyanato diarylmethane in which the molecular proportions of reacted aniline and o-toluidine are about 3 to 1, whereas to produce a distilled mixed diisocyanato diarylmethane in which the proportions of reacted aniline and o-chloraniline are about 3 to 1, it is necessary to use a mixture of 0.56 molecular proportion of aniline and 1 molecular proportion of o-chloraniline.

It is to be understood that the liquid polyisocyanate may be made by phosgenating either distilled or crude polyamine compositions or their hydrohalides, e.g. their hydrochlorides. If a distilled polyisocyanate is desired, it is preferable to use a distilled polyamine.

Being liquid at normal temperatures, the products of this invention are convenient to handle and are easily mixed with high molecular weight polyhydroxy compounds etc. in the absence or presence of solvents. Also, due to their low volatility they present a minimum toxic hazard in use. They are accordingly especially valuable in the manufacture of polyurethane products which may be homogeneous or cellular, rigid or flexible and may be in various shapes or in the form of coatings, adhesives and the like or used as potting compounds for electrical components. The polyisocyanate compositions may be used as such or they may first be converted into interaction products with phenol, acetoacetic esters and the like or into polymeric forms, especially isocyanurate polymers, by the use of basic catalysts such as alkali or alkaline earth metal oxides, hydroxides, carbonates, alcoholates or phenates, alkali metal salts of enolisable compounds, metallic salts of weak aliphatic or alicyclic carboxylic acids and the like.

The invention is illustrated but not limited by the following examples in which parts and percentages are by weight.

*Example 1*

189 parts 36% hydrochloric acid are added to a stirred mixture of 366 parts aniline, 420 parts o-toluidine and 36 parts water keeping the temperature below 60° C. After cooling to 0° C., 145 parts 37% formaldehyde solution are added dropwise at such a rate that the temperature does not exceed 5° C., the mixture being maintained at this temperature for a further 1½ hours. The product is then heated at 80° C. for 6 hours, basified with 32% sodium hydroxide, and the aqueous layer is separated. The diaminodiarylmethane mixture is isolated from the oily layer by distillation of water and substantially all unreacted monoamines at 15–25 mm. pressure. The remaining crude product is fractionally distilled at a lower pressure, the desired diaminodiarylmethane mixture distilling at 185–230° C./0.2 mm. forming a cream-coloured solid (320 parts) on cooling.

250 parts of phosgene are dissolved in 750 parts o-dichlorobenzene at −5° C. to 0° C. with stirring. A solution of 316 parts of the above diaminodiarylmethane mixture in 1960 parts of o-dichlorbenzene at 120–130° C. is added to the well-stirred phosgene solution at such a rate that the temperature can be maintained below 10° C. The white suspension is allowed to regain atmospheric temperature during 16 hours with continued stirring. A slow stream of phosgene is passed through the mixture and the temperature is raised to about 60° C. in the course of about 1½ hours when hydrogen chloride is copiously evolved. A rapid stream of phosgene is then passed while the temperature is progressively raised to 165–170° C. during 2–3 hours and so maintained until the evolution of hydrogen chloride ceases. Nitrogen is then passed rapidly at 165–170° C. to remove dissolved phosgene and hydrogen chloride from the virtually clear solution which is then cooled and filtered from traces of insoluble matter and distilled at 15 mm. pressure to remove o-dichlorbenzene. The residual crude diisocyanate mixture is fractionally distilled at lower pressure, the desired diisocyanatodiarylmethane mixture boiling at 167–184/0.2 mm. (317 parts).

The distilled diisocyanate mixture, a pale yellow oil of setting point 0.5° C. has the NCO content 31.0%, which, assuming 100% purity, indicates that the mixture contains about 25% of the isocyantophenyl and about 75% of the isocyanatotolyl moieties.

*Example 2*

293 parts aniline, 84 parts o-toluidine and 18 parts water are reacted as in Example 1, with 94.4 parts 36% hydrochloric acid and 72.4 parts 37% formaldehyde solution.

The desired diaminodiarylmethane mixture (142 parts) is collected at 166–195/0.1 mm. and is converted to the corresponding diisocyanate mixture by the procedure of Example 1, the product distilling at 162–174/0.13 mm.

The diisocyanatodiarylmethane mixture, of setting point −5° C., has the NCO content 32.2%, which, assuming 100% purity, indicates that the mixture contains about 60% of the isocyanatophenyl and about 40% of the isocyanatotolyl moities.

*Example 3*

330 parts aniline, 803 parts o-chloraniline and 18 parts water are reacted as in Example 1, with 236 parts 36% hydrochloric acid and 181 parts 37% formaldehyde solution, the diaminodiarylmethane mixture (252 parts) being distilled at 169–210° C./0.1 mm.

The diaminodiarylmethane mixture (220 parts) is converted to the corresponding diisocyanate mixture by the procedure of Example 1, the desired product, 221 parts of a pale yellow oil, setting point 10° C., being distilled at 160–190° C./0.12 mm.

The NCO content of the diisocyanatodiarylmethane mixture is 31.6%, which, assuming 100% purity, indicates that the mixture contains about 75% of the isocyanatophenyl and about 25% of the isocyanatochlorophenyl moieties.

*Example 4*

549 parts aniline, 210 parts o-toluidine, 36 parts water, 189 parts 36% hydrochloric acid and 145 parts 37% formaldehyde solution are reacted as described in Example 1. After basification, separation of the aqueous layer and removal of substantially all unreacted monoamines by distillation at 15–25 mm. pressure, there remains a crude diaminodiarylmethane mixture. By fractional distillation at a lower pressure, the desired diaminodiarylmethane mixture (310 parts) distils at 216–222° C./3.5 mm., forming a cream coloured solid on cooling. It is converted to the corresponding diiscyanatodiarylmethane by the procedure of Example 1, the desired diisocyanatodiarylmethane mixture distilling at 195–200° C. at 5 mm. pressure and forming a pale yellow oil of setting point −10° C. and containing 32.15% NCO groups.

*Example 5*

100 parts of the distilled diaminodiarylmethane mixture described in Example 4 are purified by dissolving in 230 parts hot o-dichlorobenzene and allowing the solution to cool. 3-methyl-4:4′-diaminodiphenylmethane of melting point 128–129° C. which crystallises out is filtered and adherent solvent removed by drying at 80–90° C. The yield is about 75 parts.

63 parts 3-methyl-4:4′-diaminodiphenylmethane are added over 1½ hours to a stirred solution of 100 parts phosgene in 650 parts o-dichlorobenzene cooled to 0–5° C. throughout the addition. Thereafter the temperature is raised to 20° C. over 2 hours and the mixture is stirred thereat for 16 hours. While passing a rapid stream of phosgene the temperature is raised to 160–165° C. in about 3 hours, phosgenation being complete after a further 2 hours under these conditions. A rapid stream of dry nitrogen is passed through the refluxing solution to remove dissolved phosgene and hydrogen chloride, after which the clear solution is distilled at 15 mm. pressure to remove o-dichlorbenzene. On distillation of the residual product at lower pressure, 62 parts 4:4′-diisocyanato-3-methyldiphenylmethane, boiling at 169–179° C. at 0.45–0.65 mm. pressure, are obtained; the setting point is about −13° C. This compound is a novel diisocyanate that is liquid at room temperature and is easily prepared from readily available materials and accordingly is especially valuable for use in the manufacture of polyurethanes.

*Example 6*

A solution of 525 parts crude diaminodiarylmethane mixture made as described in Example 4 in 1600 parts o-dichlorbenzene at 90–100° C. is added over 2½ hours to a stirred solution of 650 parts phosgene in 850 parts o-dichlorbenzene at 0° C., the temperature being kept below 12° C. during the addition, after which the reaction mixture is stirred for 16 hours at 15–20° C. The temperature is then raised over 3½ hours to 70° C., when a stream of phosgene is passed through the mixture which is heated to 165–170° C. in 3 hours and these conditions are maintained for a further 3½ hours. Dissolved phosgene and hydrogen chloride are expelled from the refluxing solution by a rapid stream of dry nitrogen during 6 hours. The cold solution is filtered from a small amount of insoluble matter and o-dichlorbenzene is substantially removed by distillation at 15–20 mm. pressure, concentration being completed by raising the temperature to 165° C. and lowering the pressure to 7 mm. The liquid product (658 parts) so obtained contains 29.3% NCO groups.

*Example 7*

52.5 parts 36% hydrochloric acid are added to a stirred mixture of 140 parts aniline, 54 parts o-toluidine, 24 parts m-tolylenediamine and 10 parts water below 60° C. and, after cooling to 0° C., 40.5 parts 37% aqueous formaldehyde are introduced at below 5° C. and the mixture is further reacted as in Example 1. After removal of unreacted amines by distillation at 17 mm. pressure finally up to a bath temperature of 185° C., there remain 92 parts of a crude polyaminodiarylmethane mixture which solidifies on cooling.

A cold solution of 42 parts of this crude polyaminodiarylmethane mixture in 180 parts o-dichlorbenzene is added to a stirred solution of 60 parts phosgene in 160 parts o-dichlorbenzene between 5° C. and 25° C. and the mixture is stirred at about 20° C. for 18 hours. The temperature of the mixture is raised gradually to about 80° C. and a rapid stream of phosgene introduced while raising the temperature over 1½ hours to 165–170° C. After phosgenating at this temperature for a further 3 hours, a stream of dry nitrogen is passed for 5 hours. The cold solution is filtered from a little insoluble matter, solvent distilled off at 15–20 mm. pressure, finally to a bath temperature of 168° C. at a pressure of 2.5 mm. The resulting polyisocyanatodiarylmethane mixture (51 parts) is a brown viscous liquid at ordinary temperature containing 31.8% NCO groups.

Alternatively, 50 parts of the crude polyaminodiarylmethane mixture made as above is distilled at low pressure, the desired polyaminodiarylmethane mixture distilling at 190–230° C./0.25 mm. and forming a pale yellow solid (23.5 parts) on cooling. A solution of this polyamine (23.5 parts) in 160 parts o-dichlorbenzene at about 85° C. is added to a stirred solution of 40 parts phosgene in 100 parts o-dichlorbenzene at below 10° C. The temperature is raised to 20° C. in 1½ hours and to 85° C. during the next 1½ hours, when a stream of phosgene is passed through the mixture while raising the temperature to 165–170° C. over 1½ hours. Phosgenation is complete in a further 1 hour under these conditions and, after passing dry nitrogen into the refluxing solution for 7 hours, the cooled reaction mixture is filtered from a little insoluble matter and solvent is distilled off at 15–20 mm. pressure. The desired polyisocyanatodiarylmethane mixture (24 parts) is finally distilled at 160–187° C./0.25 mm. and is a pale yellow oil at ordinary temperatures containing 33.65% NCO groups.

*Example 8*

100 parts of distilled diisocyanatodiarylmethane mixture made as described in Example 4 are stirred, under conditions which exclude moisture, with about 2 parts sodium methoxide at 103–105° C. for 14 hours. The cold liquid product is filtered from catalyst and contains 26.1% NCO groups. In order to render the product more suitable for the manufacture of cellular polyurethanes, 0.27% ionisable chlorine may be introduced into 87 parts of the product by dissolving therein 3.8 parts of diisocyanatodiarylmethane mixture containing 7.2% dissolved hydrogen chloride. The liquid product shows absorption in the infra red at 5.85 and 7.05 microns characteristic of the triaryl substituted isocyanurate ring, in addition to absorption at 4.35 microns due to the isocyanate group.

*Example 9*

102 parts of distilled diisocyanatodiarylmethane mixture made as described in Example 4 are stirred with 0.44 part of a solution of lead 2-ethylhexoate in white spirit (lead content 25.0%) at 55° C. for 5 hours. 4.7 parts of diisocyanatodiarylmethane mixture containing 7.2% dissolved hydrogen chloride are added to the warm solution which is filtered after a short time from catalyst resides. The liquid product contains 27.2% NCO groups and 0.32% ionisable chlorine and its infra-red absorption characteristics are similar to those of Example 7.

What we claim is:

1. A liquid polyisocyanate composition obtained by phosgenating a polyamine composition, said polyamine composition being the product obtained by condensing formaldehyde with at least two moles of mixed aromatic amines selected from the group of aromatic amine mixtures consisting of (*a*) aniline and o-toluidine, (*b*) aniline and o-chloroaniline and (*c*) aniline, o-toluidine and m-tolylenediamine, the proportions of the amines in said mixtures being such that of the total amines converted into polyisocyanates, not more than 80% by molecular proportions consists of any single amine, the boiling point at low pressure of said polyamine composition being in the range of about 166° C. at 0.1 mm. to 230° C. at 0.2 mm.

2. A liquid polyisocyanate composition as set forth in claim 1 in which the total amount of mixed amines is from 4 to 5 molecular proportions per molecular proportion of formaldehyde.

3. The compound 4:4′-diisocyanato-3-methyldiphenylmethane.

4. Isocyanurate polymers of the liquid polyisocyanate composition claimed in claim 1.

References Cited in the file of this patent

UNITED STATES PATENTS

| | | |
|---|---|---|
| 2,683,730 | Seeger et al. | July 13, 1954 |
| 2,801,244 | Balon | July 30, 1957 |
| 2,818,433 | Erickson | Dec. 31, 1957 |
| 2,826,526 | Meyrick et al. | Mar. 11, 1958 |
| 2,974,168 | Sharp | Mar. 7, 1961 |

FOREIGN PATENTS

| | | |
|---|---|---|
| 1,088,081 | France | Mar. 2, 1955 |
| 1,102,430 | France | May 4, 1955 |

OTHER REFERENCES

White: "Journal of the Society of Dyers and Colourists," vol. 70, No. 11, November 1954, pages 481–486.

"Hylene DMM Organic Isocyanate," E. I. du Pont de Nemours, Wilmington, Del., HR–4, December 1955.

Bailey et al.: "Ind. and Eng. Chem.," vol. 48, No. 4, April 1956, pages 794–797.